United States Patent [19]

Kawasaki

[11] 4,051,490
[45] Sept. 27, 1977

[54] PHOTOGRAPHIC EXPOSURE METER CIRCUIT HAVING TEMPERATURE COMPENSATION

[75] Inventor: Masahiro Kawasaki, Tokyo, Japan

[73] Assignee: Asahi Kogaku Kogyo Kabushiki Kaisha, Tokyo, Japan

[21] Appl. No.: 740,464

[22] Filed: Nov. 10, 1976

[30] Foreign Application Priority Data

Nov. 12, 1975 Japan .................. 50-153834[U]

[51] Int. Cl.² .................... G03B 17/18; G01J 1/44
[52] U.S. Cl. .................... 354/24; 354/60 E; 356/223
[58] Field of Search .................. 354/53, 54, 55, 56, 354/57, 60 E, 60 L, 60 R, 24; 356/223

[56] References Cited

U.S. PATENT DOCUMENTS 3,863,263  1/1975  Itagaki .................. 354/60 R X

FOREIGN PATENT DOCUMENTS 2,351,420  10/1973  Germany .................. 354/24

*Primary Examiner*—John Gonzales
*Assistant Examiner*—M. L. Gellner
*Attorney, Agent, or Firm*—Sughrue, Rothwell, Mion, Zinn and Macpeak

[57] ABSTRACT

An exposure meter circuit includes a photo diode 2 and associated components 1, 3-6 for producing a first logarithmically compressed voltage $V_1$ proportional to the apex value B, of the sensed brightness level. The temperature characteristic of the transistor 1 coupled to the diode 2 is compensated for by developing a second logarithmically compressed voltage $V_2$ and subtracting $V_1$ from it in an operational amplifier 9. The voltage $V_2$ is produced by a transistor 11 whose base is coupled to the cathode of a light emitting diode 13 and whose collector output is returned to the power supply through a diode wired transistor 12. The temperature characteristic of the LED is the same as that of a transistor, whereby compensation is realized.

4 Claims, 2 Drawing Figures

PHOTOGRAPHIC EXPOSURE METER CIRCUIT HAVING TEMPERATURE COMPENSATION

BACKGROUND OF THE INVENTION

This invention relates to a temperature compensating circuit for a photographic exposure meter.

At the present time photographic exposure meters employing a silicon photo-diode as the light sensing element are extensively used. In exposure meters of this type of photoelectric current $i_P$ of the light sensing element varies with respect to the apex (Additive Photographic EXposure system) value $B_v$ of the brightness of an object to be photographed in accordance with the following equation:

$$i_p = i_{PO} \cdot 2^{B_v} \tag{1}$$

where $i_{PO}$ is the photoelectric current when $B_v = 0$. It is difficult to directly indicate such a logarithmically varying photoelectric current with a conventional meter, however.

In order to overcome this difficulty a circuit has been proposed in which the photoelectric current is supplied to a logarithmic compression circuit utilizing the base-emitter voltage vs. collector current characteristic of a transistor or a diode, to thereby linearize the output and facilitate a more readable indication. The base-emitter voltage of the transistor or the diode characteristic varies with temperature at a rate of approximately $-2mV/°$ C, however, and in order to compensate for this temperature characteristic intricate and costly circuitry has been required.

SUMMARY OF THE INVENTION

Briefly, and in accordance with the present invention, an exposure meter circuit includes a photo diode and associated components for producing a first logarithmically compressed voltage $V_1$ proportional to the apex value $B_v$ of the sensed brightness level. The temperature characteristic of the transistor coupled to the diode is compensated for by developing a second logarithmically compressed voltage $V_2$ and subtracting $V_1$ from it in an operational amplifier. The voltage $V_2$ is produced by a transistor whose base is coupled to the cathode of a light emitting diode and whose collector output is returned to the power supply through a diode wired transistor. The temperature characteristic of the LED is the same as that of a transistor, whereby compensation is realized.

DETAILED DESCRIPTION OF THE PREFERRED EMBODIMENT

Figure 1:
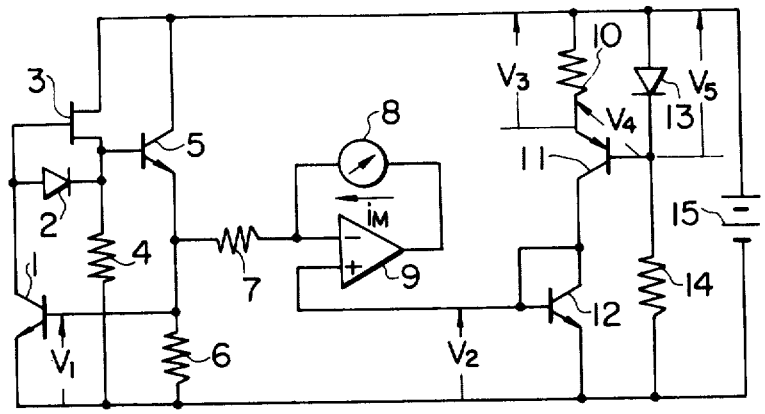
FIG. 1 shows a schematic circuit diagram illustrating an embodiment of the present invention.

In FIG. 1, reference numeral 1 designates a logarithmic compression transistor. A photo diode 2, and the gate of a field effect transistor 3 forming a self-biasing circuit with a resistor 4, are connected to the collector of transistor 1. A transistor 5 forming an emitter follower circuit with a resistor 6 is connected to the source of field effect transistor 3. The emitter of transistor 5 is connected to the base of transistor 1.

A light emitting diode 13 and a resistor 14 are connected in series across a power supply 15. The base of a transistor 11 is connected to the cathode of the light emitting diode 13. A resistor 10 is connected to the emitter of transistor 11, and a diode-connected transistor 12 is connected to the collector of transistor 11. Reference numeral 9 designates an operational amplifier. The base of transistor 12 is connected to the positive or non-inverting input terminal of the amplifier 9, and a resistor 7 is connected between the emitter of transistor 5 and the negative or inverting input terminal of the amplifier. The amplifier output is fed back to its inverting input terminal through a meter 8.

In operation, feedback is effected from the collector to the base of transistor 1 through the field effect transistor 3 and transistor 5. The collector of transistor 1 is driven in a constant current mode by the photoelectric current $i_P$ of the photo diode 2, and thus the voltage $V_1$ across the base and emitter of transistor 1 may be represented by the following equation:

$$V_1 = (KT/q) \ln (i_p/i_o) + V_{BE}(i_o) \tag{2}$$

where:

$K$ is a Holtzmann constant,
$T$ is the absolute temperature,
$q$ is the electron charge, and
$V_{BE}(i_o)$ is the voltage across the base and emitter with a collector current of $i_o$.

Figure 2:
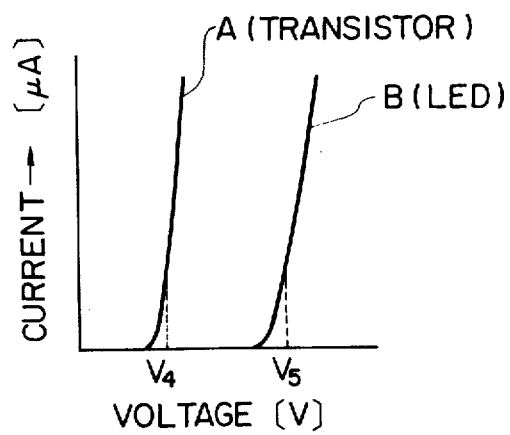
FIG. 2 shows a graphical representation of the forward voltage vs. forward current characteristic of a light emitting diode, and the base-emitter voltage vs. collector current characteristic of a transistor.

FIG. 2 shows the forward voltage characteristic curve B of a light emitting diode and the base-emitter voltage vs. collector current A of a transistor.

The forward voltage $V_5$ of the light emitting diode 13 with a current of 100 $\mu$ is on the order of 1.4V, while the base-emitter voltage of transistor 11 with a current of 100 $\mu$ is on the order of 0.6V. Therefore, the voltage $V_3$ across the resistor 10 is equal to the difference between the voltages $V_5$ and $V_4$ ($V_3 = V_5 - V_4$), or about 0.8V. The temperature dependance of the forward voltage $V_5$ of the light emitting diode 13 is substantially equal to that of the base-emitter voltage $V_4$ of transistor 11, and therefore the voltage $V_3$ across the resistor 10 and has no temperature dependance. The variation of the forward voltage of the light emitting diode due to current is such that it varies by about 30mV with a two-fold current variation, and thus it is significantly smaller than the voltage $V_3$ (about 0.8V) across the resistor 10. Thus, the voltage $V_3$ has no appreciable current dependability. Assuming that the resistance of resistor 10 is $R_1$, then the collector current $i_1$ of transistor 11 is given by:

$$i_1 = (V_3/R_1) \tag{3}$$

Therefore, the base-emitter voltage $V_2$ of the transistor 12 is:

$$V_2 = (KT/q) \ln (i_1/i_o) + V_{BE}(i_o) \tag{4}$$

If the resistance of resistor 7 is $R_2$, then the current $i_M$ through the meter 8 is:

$$i_M = (V_2 - V_1)/R_2$$
$$= (KT/R_2 q) \ln (i_1/i_p) \tag{5}$$

Substituting Equation (1) into Equation (5) yields:

$$i_M = (KT/R_2 q)[\ln (i_1/i_{PO}) - B_v \ln 2] \tag{6}$$

If the collector $i_1$ of transistor 11 is set a value of $2^{15} \cdot i_{PO}$, then Equation (6) can be rewritten as follows:

$$i_M = (KT/R_2 q) \ln 2 \, (15 - B_v) \qquad (7)$$

With $B_v = 15$, the meter current $i_M = 0$. A one step change of $B_v$ causes a current change of $(KT/R_2 q) \ln 2$. If the resistance $R_2$ of resistor 7 is selected to have a temperature coefficient of $R_2 = N \cdot T$ (where N is a constant), then it is readily apparent that the above-described meter has no temperature dependability.

The embodiment described above is an analog meter indicating circuit utilizing the base-emitter voltage of transistor 1 and the base-emitter voltage of transistor 12. However, it should be noted that meter output can easily be converted to a digital indication by using an appropriate A/D converter system and an array of light emitting diodes.

As is apparent from the above description, according to this invention a resistor is connected to the emitter of a transistor to whose base the forward voltage of a light emitting diode is applied, the constant current of the transistor collector is subjected to logarithmic compression, and a meter indication is effected on the basis of such logarithmically compressed signal and a similar logarithmically compressed voltage proportional to the brightness of a photographic object, whereby a simple indicating circuit is provided having excellent temperature dependability and a very satisfactory voltage vs. brightness characteristic.

What is claimed is:

1. In a temperature compensating photographic exposure meter circuit including means incorporating a photo sensitive element for producing a first logarithmically compressed voltage proportional to the apex value of the brightness of a photographic object, the improvement characterized by:
   a. a transistor (11),
   b. a resistor (10) connected to the emitter of said transistor,
   c. a light emitting diode (13) having its cathode connected to the base of said transistor,
   d. means (12) for converting the collector output of said transistor into a second logarithmically compressed voltage, and
   e. meter indication means responsive to the difference between said first and second logarithmically compressed voltages.

2. An exposure meter circuit as defined in claim 1, wherein said converting means comprises a diode wired transistor.

3. An exposure meter circuit as defined in claim 1, wherein said meter indication means comprises an operational amplifier (9) and a meter indicator (8), and wherein:
   a. said first voltage is applied to an inverting input of said amplifier,
   b. said second voltage is applied to a non-inverting input of said amplifier, and
   c. said meter indicator is connected in a feedback path of said amplifier.

4. An exposure meter circuit as defined in claim 2, wherein said meter indication means comprises an operational amplifier (9) and a meter indicator (8), and wherein:
   a. said first voltage is applied to an inverting input of said amplifier,
   b. said second voltage is applied to a non-inverting input of said amplifier, and
   c. said meter indicator is connected in a feedback path of said amplifier.

* * * * *